April 23, 1968  J. PERROCHAT  3,378,890
MOLDING FASTENER
Filed Nov. 8, 1966  2 Sheets-Sheet 1
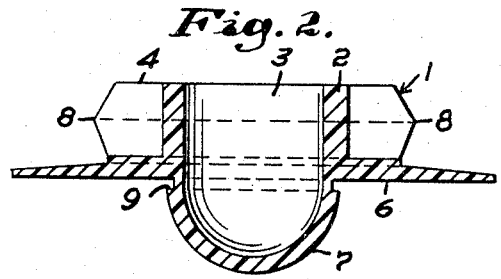
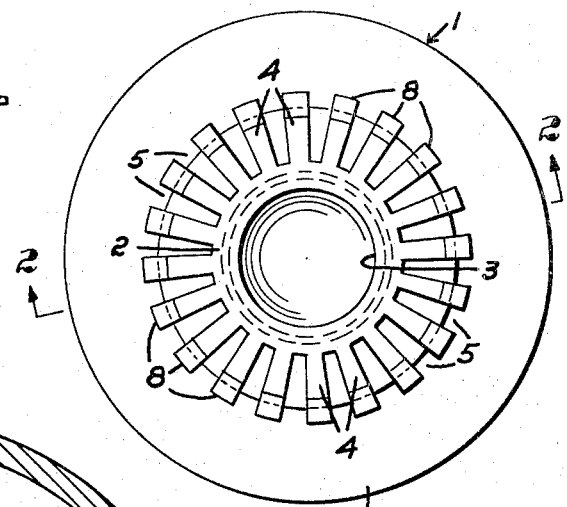
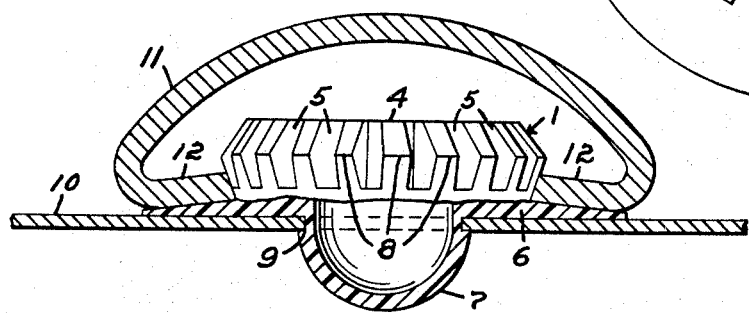
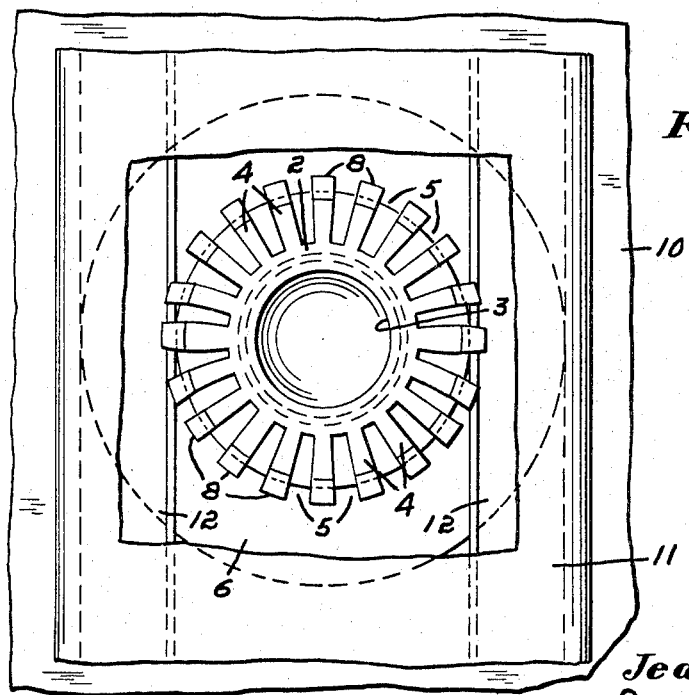
Inventor:
Jean Perrochat,
by James R O'Connor
Atty.

United States Patent Office 3,378,890
Patented Apr. 23, 1968

3,378,890
MOLDING FASTENER
Jean Perrochat, Lorrach, Baden, Germany, assignor to
A. Raymond, Baden, Germany
Filed Nov. 8, 1966, Ser. No. 592,921
Claims priority, application Germany, Nov. 16, 1965,
R 41,999; Dec. 16, 1965, R 42,228
8 Claims. (Cl. 24—73)

ABSTRACT OF THE DISCLOSURE

A molding fastener formed of a molded, synthetic plastic material. A generally flat base portion has a centrally located, tubular body portion extending upwardly therefrom and a plurality of flexible bridges extending radially from said body portion. Each of the bridges is spaced from the adjacent bridge by an opening extending to the periphery of the body portion. When a molding is clamped onto the fastener, certain of the bridges are displaced both radially and axially to provide enlarged area for engagement by the molding. The fastener also includes means for attaching it to a supporting structure.

---

This invention relates generally to molding fasteners and more particularly to a molding fastener formed of a molded plastic material of a circular configuration and having openings to allow for substantial flexing of the molding engaging portions thereof to form an enlarged support area for the molding when the latter is buttoned onto the fastener.

Fasteners of the type disclosed herein are rather well known in the prior art. These may generally be categorized by the A. O. Jansson U.S. Patent 3,138,225, wherein the clamping portion, which engages the molding, has an unsymmetrical shape; the C. W. Cochran U.S. Patent 3,116,526, which has parallel, right angular clamping portions; and a third type, wherein a circular gap in the body portion is located between an intermediate portion and an external, circumferential clamping ring. The major disadvantage of the patented devices mentioned above is that the molding must always be precisely aligned with the fastener prior to attachment. This disadvantage takes on increased significance when one considers that a plurality of fasteners are often utilized to secure a given length of molding. The disadvantage of the third type of fastener mentioned is that the outer circumferential ring is only flexed in a radial direction when the molding is snapped on and this results only in a point or at best a line-like engagement of molding and fastener which is an insufficient attachment likely to release when the assembly is subjected to vibration or shock.

The present device was designed to overcome these prior art deficiencies by providing a molding engaging portion having a circular shape in the form of a plurality of radially extending bridges which are displaceable from their normal position in both a radial and an axial direction when the molding is buttoned on to the fastener, thereby providing an enlarged molding engaging area and a secure attachment against the forces of vibration.

Thus, an object of the invention is to provide a simple, inexpensive and highly efficient molding fastener.

Another object of the invention is to provide a molded plastic fastener having a circular configuration wherein the molding engaging portions are displaceable in multiple directions to provide an enlarged support area for a molding.

Figure 5:
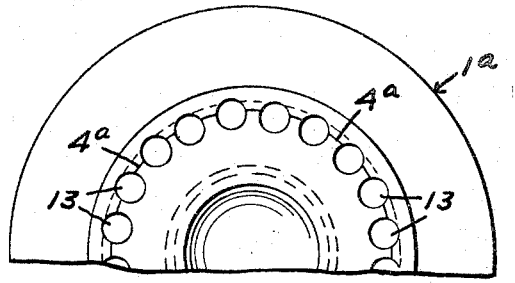
Figure 6:
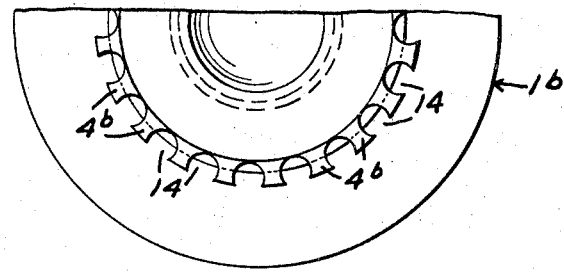
Figure 7:
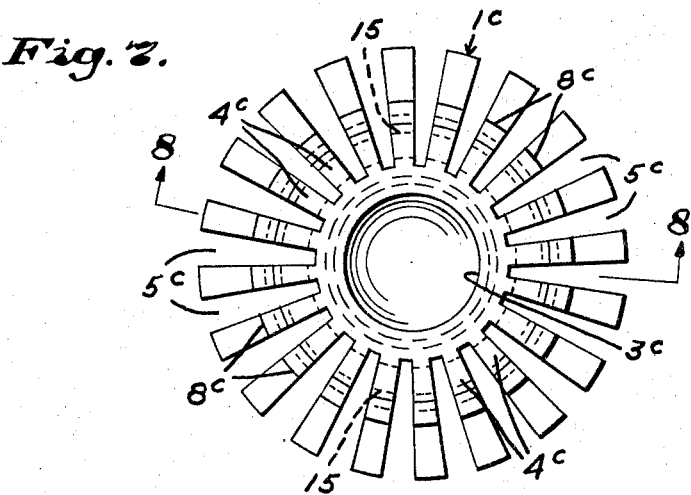
Figure 8:
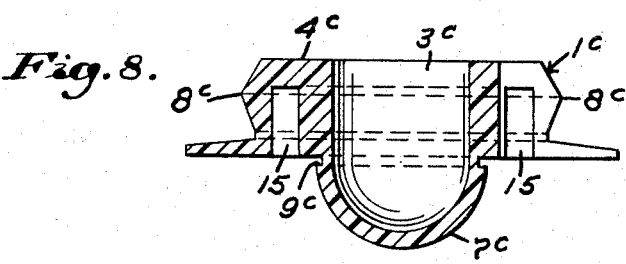

Additional objects and advantages of the novel fastener will become evident from a reading of the following detailed description in conjunction with a viewing of the accompanying drawings, in which:

FIG. 1 is a top plan view of the fastener;
FIG. 2 is a section taken on line 2—2 of FIG. 1;
FIG. 3 is a side elevation partly in section of an installation depicting the fastener attached to an apertured panel and a molding secured to the fastener;
FIG. 4 is a top plan view of the installation shown in FIG. 3 with the molding partially broken away;
FIG. 5 is a partial top plan view of a first alternate form of the invention;
FIG. 6 is a partial top plan view of a second alternate form of the invention;
FIG. 7 is a top plan view of another form of the invention; and
FIG. 8 is a section taken on line 8—8 of FIG. 7.

The fastener 1 has a circular shape, is formed of a molded, synthetic plastic, for example, nylon, and includes a body portion 2 defining a central opening 3, a plurality of bridges 4, spaced from each other by slots 5, and extending radially outwardly from the body portion, a flat circular base 6 which extends beyond the periphery of the bridges 4, and a hollow attaching plug 7 depending from the base 6 with the hollow portion forming a continuation of the opening 3.

Each of the bridges 4 is equally spaced from the adjacent bridges by the slots 5 and each has a generally V-shaped profile forming knuckles 8 over which the inturned flanges of a sheet metal molding are snapped. The outer surfaces of the bridges below the knuckles act as a bearing surface or support for the internal edges of the molding.

The upper end of the attaching plug 7 adjacent the base 6 is necked to provide a shoulder 9 for engaging the inner surface of an apertured body panel.

Referring to FIGS. 3 and 4, one will observe an installation wherein the fastener is joined to an apertured panel 10 by inserting the hollow plug 7 into the aperture until the edge of the panel snaps past the shoulder 9 and seats in the necked portion of the plug. The C-shaped spring metal molding 11 having inturned flanges 12 is thereafter pressed onto the fastener until the flanges snap beyond the knuckles 8 and seat against the lower surfaces of bridges 4. The outer portion of the base 6 isolates the undersurface of the flanges 12 from the panel 10 to prevent the latter from being scratched and to inhibit the development of electrolytic corrosion which frequently occurs when parts of dissimilar metals, such as an aluminum molding and steel body panel, are in contact and exposed to moisture.

The improvement in the art represented by the present device is best seen by having reference to FIGURE 4 wherein one will observe that a plurality of the bridges 4 are engaged by each of the molding flanges and the engaged bridges are flexed in both an axial and radial direction thus maintaining considerable pressure on the molding and insuring a secure fastening even under conditions of extreme vibration or shock. Further, since the fastener has a circular configuration, there is no need to precisely align the molding therewith prior to pressing the flanges over the bridges. The reader will also note that a large area of support for the molding is created by the displaced bridges as opposed to the point or line-like engagement characteristic of the prior art devices mentioned earlier.

FIGURES 5 and 6 disclose alternate forms of the invention wherein the bridges 4a and 4b, respectively, are formed between a plurality of circular holes 13 in the first instance and a plurality of semi-circular cutouts 14 in the fastener 1b.

The fastener 1c is very similar to that depicted in FIGS. 1 and 2. However, to provide increased flexibility in the bridges 4c, each is formed with an internal groove 15 extending upwardly beyond the knuckles 8c. The addition of the groove 15 allows for more pronounced radial and axial displacement of the bridges and consequently a greater area of engagement for the molding flanges.

While several forms of the invention have been described for purposes of illustration, it is to be clearly understood that the disclosure is not to be interpreted in a limiting sense in that the scope of the invention can best be determined by having reference to the following claims.

I claim:

1. A molding fastener formed of a molded synthetic plastic material comprising a generally flat base portion, a centrally located, generally tubular body portion extending upwardly from said base portion, a plurality of flexible bridges extending radially from said body portion, each of said bridges being spaced from adjacent bridges by a plurality of openings at the periphery of said body portion whereby the clamping of a molding onto said fastener causes both an axial and radial displacement of said bridges to provide an enlarged area for engagement by the molding, and means for attaching said fastener to an apertured panel.

2. A molding fastener according to claim 1 wherein each of said bridges has a generally V-shaped profile forming a knuckle at its periphery.

3. A molding fastener according to claim 1 wherein said base portion extends outwardly beyond the periphery of said bridges to isolate the undersurfaces of a molding secured to the fastener from a supporting panel.

4. A molding fastener according to claim 1 wherein said means are in the form of a hollow flexible plug, the hollow in said plug being an axial continuation of the opening in said body portion.

5. A molding fastener according to claim 1 wherein the openings adjacent said bridges are in the form of wedge-shaped slots.

6. A molding fastener according to claim 1 wherein the openings adjacent said bridges are circular.

7. A molding fastener according to claim 1 wherein the openings adjacent said bridges are semi-circular cutouts.

8. A molding fastener according to claim 1 wherein each of said bridges has an internal groove to allow for more pronounced displacement of said bridges by the molding.

References Cited

UNITED STATES PATENTS

| 655,696 | 8/1900 | Dowse | 24—213 |
|---|---|---|---|
| 2,540,790 | 2/1951 | Kost | 24—213 |
| 2,640,238 | 6/1953 | Schuhr | 24—113 |
| 3,018,529 | 1/1962 | Perrochat | 24—213 X |
| 3,138,225 | 6/1964 | Jansson. | |
| 3,251,103 | 5/1966 | Saut | 52—718 XR |

FOREIGN PATENTS 1,254,784   1/1961   France.

DONALD A. GRIFFIN, *Primary Examiner.*

WILLIAM FELDMAN, *Examiner.*

G. WEIDENFELD, *Assistant Examiner.*